(12) United States Patent
Miyaji et al.

(10) Patent No.: US 7,729,391 B2
(45) Date of Patent: Jun. 1, 2010

(54) TRANSMITTING DEVICE WITH DISCARD CONTROL OF SPECIFIC MEDIA DATA

(75) Inventors: Satoshi Miyaji, Saitama (JP); Yasuhiro Takishima, Saitama (JP)

(73) Assignee: KDDI Corporation, Tokyo (JP)

( * ) Notice: Subject to any disclaimer, the term of this patent is extended or adjusted under 35 U.S.C. 154(b) by 879 days.

(21) Appl. No.: 11/247,174

(22) Filed: Oct. 12, 2005

(65) Prior Publication Data

US 2006/0109870 A1 May 25, 2006

(30) Foreign Application Priority Data

Oct. 15, 2004 (JP) ............................. 2004-301609
Jun. 6, 2005 (JP) ............................. 2005-165371

(51) Int. Cl.
*H02J 3/02* (2006.01)
(52) U.S. Cl. ...................... 370/537; 370/538; 370/542
(58) Field of Classification Search .............. 348/14.12; 370/474, 535–537, 538, 542, 543; 375/240.1, 375/240.25
See application file for complete search history.

(56) References Cited

U.S. PATENT DOCUMENTS

| | | | |
|---|---|---|---|
| 5,231,492 A * | 7/1993 | Dangi et al. .............. 348/14.12 |
| 5,894,328 A * | 4/1999 | Negishi ................... 375/240.25 |
| 6,081,299 A * | 6/2000 | Kesselring ................... 348/512 |
| 6,212,208 B1 * | 4/2001 | Yoneda et al. .............. 370/538 |
| 6,359,910 B1 * | 3/2002 | Takahashi ................... 370/535 |
| 6,608,841 B1 * | 8/2003 | Koodli ........................ 370/474 |
| 6,744,975 B1 * | 6/2004 | Kimura ........................ 386/98 |
| 6,785,733 B1 * | 8/2004 | Mimura et al. .............. 709/236 |
| 6,873,629 B2 * | 3/2005 | Morris ........................ 370/535 |
| 2002/0041609 A1 * | 4/2002 | Toida et al. ................. 370/535 |
| 2004/0190608 A1 * | 9/2004 | Takahashi .............. 375/240.01 |

FOREIGN PATENT DOCUMENTS

JP          2004-289583          10/2004

OTHER PUBLICATIONS

H. Schulzrinne, et al., "RTP: A Transport Protocol for Real-Time Applications", IETF RFC3550 (Internet Engineering Task Force—Request for Comment 3550), pp. 1-89, Internet address: http://www.faqs.org/rfcs/rfc3550.html, Jul. 2003.

Y. Kikuchi, et al., "RTP Payload Format for MPEG-4 Audio/Visual Streams", IETF RFC3016 (Internet Engineering Task Force—Request for Comment 3016), pp. 1-21, Internet address: http://www.faqs.org/rfcs/rfc3016.html, Nov. 2000.

(Continued)

*Primary Examiner*—William Trost, IV
*Assistant Examiner*—Emmanuel Maglo
(74) *Attorney, Agent, or Firm*—Oblon, Spivak, McClelland, Maier & Neustadt, L.L.P.

(57) ABSTRACT

A transmitting device includes a first buffer for temporarily storing audio data, a second buffer for temporarily storing video data, a multiplexing unit for outputting audio data coming from the first buffer and video data coming from the second buffer onto a single signal channel, and a transmission buffer monitoring unit for monitoring the amount of first buffered data stored in the first buffer and, if the amount of the first buffered data exceeds a first threshold, instructing the second buffer to discard video data.

15 Claims, 12 Drawing Sheets

OTHER PUBLICATIONS

J. Sjoberg, et al., "Real-Time Transport Protocol (RTP) Payload Format and File Storage Format for the Adaptive Multi-Rate (AMR) and Adaptive Multi-Rate Wideband (ARM-WB) Audio Codecs", IETF RFC3267 (Internet Engineering Task Force—Request for Comment 3267), pp. 1-49, Internet address: http://www.faqs.org/rfcs/rfc3267.html, Jun. 2002.

* cited by examiner

TRANSMITTING DEVICE WITH DISCARD CONTROL OF SPECIFIC MEDIA DATA

PRIORITY CLAIM

The present application claims priority from Japanese Patent Application No. 2004-301609 filed on Oct. 15, 2004 and Japanese Patent Application No. 2005-165371 filed on Jun. 6, 2005, which are incorporated herein by reference.

BACKGROUND OF THE INVENTION

1. Field of the Invention

The present invention relates to a transmitting device with discard control of specific media data.

2. Description of the Related Art

A transmitting device capable of transmitting different types of media data separately encodes simultaneously generated media data, constructs the data into frames with proper sizes, and then transmits the frames to a network. A receiving device, on the other hand, uses different media decoders to decode received media data of different types, frame by frame. Determination of a proper size of a frame of each type of different types of media data is important in multimedia data multiplexing.

FIG. 1 illustrates a functional configuration of a transmitting device that transmits different types of media data and a receiving device.

A transmitting device 1 encodes and transmits video and audio data in real time. A camera 4 for producing video signals and a microphone 5 for producing audio signals are connected to this transmitting device 1. This transmitting device 1 communicates with a receiving device 2 through an IP (Internet Protocol) network 3.

The transmitting device 1 has, for processing video data, a format converter 101, a video encoder 102, a video data buffer 103, and an RTP (Real-time Transport Protocol) header adding section 104. For processing audio data, the transmitting device 1 has an amplifier 110, an A/D (Analog/Digital) converter 109, an audio encoder 108, an audio data buffer 107, and an RTP header adding section 106. In addition, the transmitting device 1 has a UDP (User Datagram Protocol)/IP protocol stack section 105, which multiplexes multiple media data each having a UDP port number assigned, and outputs the multiplexed data to the IP network 3.

A video signal provided from the camera 4 is converted by the format converter 101 into a video format appropriate for compression encoding. The converted video signal is compression-encoded by the video encoder 102. This encoding scheme is to generate coded data of each frame (screen image) as a unit. An example of such encoding scheme is ISO/IEC (International Organization for Standardization/International Electrotechnical Commission) MPEG-4 (Moving Picture Experts Group-4) Visual. According to a low-bit-rate MPEG-4, each frame is generated every 100 milliseconds (10 frames per second). The generated bit stream data is provided to the video data buffer 103. The RTP header adding section 104 adds an RTP header to each frame of video data taken out of the buffer 103. UDP and IP headers are added to each of the RTP packets by the UDP/IP protocol stack section 105 and the packets are sent out to the IP network 3.

On the other hand, an audio signal from the microphone 5 is amplified by the amplifier 110 and converted by the A/D converter 109 into PCM digital data. The audio data is then compression-encoded by the audio encoder 108. The encoding scheme is to generate coded data of frames so that each frame has a predetermined time length. Examples of such encoding scheme include 3GPP (3rd Generation Partnership Project) AMR (Adaptive Multi Rate). In the AMR, each frame is 20 milliseconds long. The generated bit stream is provided to the audio data buffer 107. The RTP header adding section 106 adds an RTP header to each frame of audio data taken out of the buffer 107. UDP and IP headers are added to each of the RTP packets by the UDP/IP protocol stack section 105 and the packets are sent out to the IP network 3.

The receiving device 2 is connected to the IP network 3 for receiving data packets and decodes received data packets according to the media data type of the packets.

Table 1 shows data structures of packet-multiplexed frames according to the conventional art.

TABLE 1

| IP Header | UDP Header | RTP Header | Audio Data |
|---|---|---|---|
| IP Header | UDP Header | RTP Header | Video Data |

According to the conventional art, both audio data frames and video data frames are separately required. This is because frames of different media data are decoded by specific decoders for the respective media data.

According to the conventional art described above, the following RTP packets are generated. The assumption here is that encoding parameters have typical values at a low transmission rate (64 kilobits/second).

Video encoding bit rate; 32 kilobits/second, Frame rate; 10 frames/second,

Audio encoding bit rate; 6,800 bits/second, Frame length; 20 milliseconds,

RTP header size; 12 bytes,

UDP header size; 8 bytes,

IP header size; 20 bytes.

For video data:

Video encoding bit rate; (32 kilobits/second)/(8 bits)=4 kilobytes/second,

Number of frames transmitted per second; 10 frames/second,

Video data packet transmission interval; 1 second/10 frames=100 millisecond/frame, Frame rate; (4 kilobytes/second)/(10 frames/second)=400 bytes/frame, Size of 1 video packet; 400 bytes+12 bytes+8 bytes+20 bytes=440 bytes, Transmission time of 1 video packet; (440 bytes×8 bits)/(64 kilobits/second)=55 milliseconds.

For audio data:

Audio encoding bit rate; (6,800 bits/second)/(8 bits)=850 bytes/second,

Number of frames transmitted per second; 50 frames/second,

Audio data packet transmission interval; (1 second)/(50 frames)=20 milliseconds/frame, Number of bytes per frame; 850 bytes/second×20 millisecond=17 bytes/frame, Size of 1 audio packet; 17 bytes+12 bytes+8 bytes+20 bytes=57 bytes, Transmission time of 1 audio packet; (57 bytes×8 bits)/(64 kilobits/second)=7.125 milliseconds.

The audio data packets are transmitted at intervals of 20 milliseconds whereas the video data packets are transmitted at intervals of 100 milliseconds. Accordingly, transmission of a video data packet breaks in every 5th audio data packet transmission.

FIG. 2 illustrates a transmission sequence of frames according to the conventional art.

An audio data packet is transmitted every 20 milliseconds whereas a video data packet is transmitted every 100 milliseconds. An audio data packet consists of a 40-byte-long header (IP, UDP, and RTP) portion and a data portion. If the data portion is 17 bytes long, transmission of the audio data packet takes 7.125 milliseconds. A video data packet consists of 40-byte-long header portion and a data portion. If the data portion is 400 bytes long, transmission of the video data packet takes 55 milliseconds.

Suppose an audio data packet A3 in FIG. 2 is transmitted immediately after the transmission of a video data packet V1, for example. The video data packet V1 arrives at the receiving device 55 milliseconds after it is transmitted from the transmitting device. The audio data packet A3, on the other hand, arrives at the receiving device 7.125 milliseconds after that, that is, 62.125 milliseconds after it is transmitted from the transmitting device. Accordingly, while the transmission interval from the transmitting device is 20 milliseconds, the audio data packet immediately before which the video data packet has been transmitted is received at the receiving device 62 milliseconds after its transmission. Subsequently, audio data packets A4, A5, A6 and A7 arrive at the receiving device in succession. Because the time required for the transmission of an audio data packet, namely 7 milliseconds, is short enough compared with a transmission interval of 20 milliseconds, the arrival-interval of the audio data packets at the receiving device will be restored to its original length in the course of time. However, a variation in arrival delay occurs again because another video data packet is inserted between audio data packets.

Audio data must be continuous when it is reconverted into an analog signal and played back. In this respect, audio data differs from frame-by-frame based discrete data such as video data. Therefore, the receiving device stores audio data packets in a buffer before playback in accordance with the maximum amount of delay of arrival of audio data packets. Delay variations of audio data packets require a large amount of buffer storage at the receiving end and thereby increase delay in the entire transmission.

Furthermore, according to the conventional art, RTP, UDP and IP headers must be added to each of video and audio data packets individually. Accordingly, the following header overhead is required:

(12 bytes+8 bytes+20 bytes)×8 bits×(50 audio frames+10 video frames)=19.2 kilobits/second.

There is a method for reducing delay variations of audio data packets in which video data packets are divided into sub-packets and video data sub-packets and audio data packets are alternately transmitted. In this case, jitter in arrival time of audio data packets can be avoided because both audio and video packets are transmitted at equal intervals. However, this method further increases header overhead, impairing significantly the efficiency of transmission as follows:

(12 bytes+8 bytes+20 bytes)×8 bits×(50 audio frames+50 video frames)=32 kilobits/second.

Known prior-arts are IETF RFC 3550 (Internet Engineering Task Force-Request For Comment 3550) that defines RTP, IETF RFC 3016 that defines an RTP format for carrying MPEG-4 video data, and IETF RFC 3267 that defines an RTP format for carrying AMR data.

If the bit rate of a transmission channel is lower than that of multiplexed frames, the number of multiplexed frames stored in a multiplex buffer increases with time. On the Internet where no bandwidth guarantees are provided, or mobile communication networks where radio communication environments tend to change, the bit rate of a transmission channel significantly changes. For audio data in real-time communications, audible discontinuities occur when the audio data does not arrive at desired time intervals. For video data, users perceive jitter as variations of frame intervals and display delay. Thus, according to the conventional art, transmission of media data of one type affects delay variations in transmission of media data of another type.

Especially in real-time communications such as IP video telephony, at least audio data must be transmitted without delay so that conversations can be carried out. Therefore, in an environment where the bit rate of a transmission channel changes, control is required for reliably transmitting audio data.

SUMMARY OF THE INVENTION

It is therefore an object of the present invention to provide a transmitting device capable of controlling transmission of media data of one type to an extent that does not affect delay variations in transmission of media data of another type.

According to the present invention, a transmitting device includes a first buffer for temporarily storing first media data to be transmitted, a second buffer for temporarily storing second media data to be transmitted, a multiplexing unit for multiplexing the first media data coming from the first buffer and the second media data coming from the second buffer to output a multiplexed data onto a single signal channel, and a transmission buffer monitoring unit for monitoring the amount of buffered data stored in the first buffer and, when the amount of the buffered data exceeds a first threshold, instructing the second buffer to discard the second media data.

As the transmission channel rate decreases, the rate at which data is extracted from a buffer decreases and the buffer level gradually increases. If voice conversation is to be given priority under such conditions, video data already stored in the video data buffer is discarded and only audio data, which has a lower bit rate than video data, is transmitted. The bit rate of audio data in general is well lower than that of video data. Therefore, even in a state where the transmission channel rate is decreasing, excessive data generation is avoided and stable voice conversation can be achieved.

Furthermore, according to the present invention, the amount of multiplexed data can be optimally adjusted keeping consistent with a network condition where the network speed is fluctuating. Thus, the maximum efficiency of use of the network can be maintained while preventing delay accumulation due to excessively generated multiplexed data.

It is preferred that the transmitting device further includes a transmission rate measuring unit that starts measuring a transmission channel rate when the amount of the buffered data is less than or equal to a second threshold for the duration of a predetermined time TM after the amount of the buffered data has exceeded the first threshold, and that the transmission buffer monitoring unit instructs the second buffer to stop discarding the second media data when the transmission channel rate recovers to a value higher than or equal to a predetermined rate.

According to the present invention, also a transmitting device includes a first buffer for temporarily storing first media data to be transmitted, a multiplexing unit for multiplexing the first media data coming from the first buffer and second media data to output frames onto a single signal channel, a second buffer for temporarily storing the frames coming from the multiplexing unit, and a multiplexing size determining unit for monitoring the amount of buffered data stored in the second buffer and, when the amount of the buffered data in the second buffer is less than the maximum transmittable size, controlling the first buffer to transfer an amount of the first media data, which is equivalent to the difference between the amount of the buffered data stored in the second buffer and the maximum transmittable size.

It is preferred that the transmitting device further includes a network interface unit for transmitting frames coming from the second buffer to a network, and a transmission channel rate estimating unit for calculating the maximum transmittable size on the basis of transmission channel state parameters obtained from the network interface unit and outputting the calculated maximum transmittable size to the multiplexing size determining unit.

It is also preferred that the transmitting device further includes a buffer monitoring unit for monitoring the amount of buffered data stored in the first buffer and, when the amount of the monitored buffered data exceeds a second threshold, for instructing the first buffer to discard the first media data.

It is further preferred that the transmitting device further includes a multiplex buffer monitoring unit for monitoring the amount of buffered data stored in the second buffer and, when the amount of the monitored buffered data becomes less than a second threshold, for outputting a reset signal to the buffer monitoring unit, the buffer monitoring unit, in response to the reset signal, instructing the first buffer to stop discarding the first media data.

It is preferred that the first buffer includes an array of access units and wherein the first buffer, when discarding the data stored therein, lefts the oldest access unit in the buffer and discards the access units that follow the left access unit.

It is also preferred that the transmitting device further includes a elapsed time determining unit for, when the buffer monitoring unit instructs the first buffer to discard video data and the duration of time that the first buffer is discarding the video data exceeds a predetermined threshold time, outputting an indication of that state to an external destination.

According to the present invention, further, a transmitting device includes a first buffer for temporarily storing first media data to be transmitted, a second buffer for temporarily storing second media data to be transmitted, a multiplexing unit for generating a packet-multiplexed frame of different types of media data, the packet having a data structure including a UDP header followed by a serial number portion, a first media data size portion, a first media data having the length equal to the size contained in the first media data size portion and second media data, a third buffer for temporarily storing the frame generated by the multiplexing unit, a packet demultiplexing unit for demultiplexing the frame stored in the third buffer into a serial number portion, a first media data size portion, a first media data having the length equal to the size contained in the first media data size portion and second media data, and for discarding the demultiplexed second media data, a remultiplexing unit for regenerating a frame having a data structure including the demultiplexed serial number portion, the first media data size portion and the first media data having the length equal to the size contained in the first media data size portion and for inputting the frame into the third buffer, a switch connected between the third buffer and the packet demultiplexing unit, and a transmission buffer monitoring unit for holding a first threshold for the third buffer, for monitoring the number of frames stored in the third buffer, for instructing the second buffer to stop transferring the second media data when the number of frames exceeds the first threshold, and for controlling the switch to be turned on to input frames stored in the third buffer into the packet demultiplexing unit.

It is preferred that the transmitting device further includes a transmission rate measuring unit for starting to measure a transmission rate when the number of frames stored in the third buffer is less than or equal to a second threshold for the duration of a predetermined time TM after the number of frames stored in the third buffer has exceeded the first threshold, and that, when the transmission channel rate recovers to a value higher than or equal to a predetermined rate, the transmission buffer monitoring unit instructs the second buffer to resume transferring the second media data so as to cause the third buffer to stop discarding frames stored therein and controls the switch to be turned off to transmit frames stored in the third buffer.

It is also preferred that the multiplexing unit includes an adding unit for providing the serial number, a first memory for temporarily storing the first media data, a second memory for temporarily storing the second media data, and a multiplexed-packet generating unit for repeating generation of a multiplexed packet by containing the serial number provided from the adding unit in the serial number portion of the frame, then by containing a first media data size provided from the first memory in the first media data size portion of the frame, then by containing the first media data provided from the first memory and having the length equal to the size contained in the first media data size portion in the frame, and then by containing the second media data provided from the second memory in the frame.

It is further preferred that the first media data is audio data and the second media data is video data.

According to the present invention, still further, a method for causing a computer to function as a transmitting device, the method includes a step of temporarily storing first media data to be transmitted in a first buffer, a step of temporarily storing second media data to be transmitted in a second buffer, a step of multiplexing the first media data coming from the first buffer and the second media data coming from the second buffer onto a single signal channel so as to output, a step of monitoring the amount of buffered data stored in the first buffer, and a step of instructing the second buffer to discard the second media data when the amount of the buffered data stored in the first buffer exceeds a first threshold.

According to the present invention, further, a method for causing a computer to function as a transmitting device having, the method includes a step of temporarily storing first media data to be transmitted in a first buffer, a step of multiplexing the first media data coming from the first buffer and second media data onto a single signal channel so as to output, a step of temporarily storing frames coming from the multiplexing unit in a second buffer, a step of monitoring the amount of buffered data stored in the second buffer, and a step of controlling the first buffer to transfer an amount of the first media data that is equivalent to the difference between the amount of the buffered data stored in the second buffer and the maximum transmittable size when the amount of the buffered data stored in the second buffer is less than the maximum transmittable size.

According to the present invention, further, a method for causing a computer to perform as a transmitting device having, the method includes a step of temporarily storing first media data to be transmitted in a first buffer, a step of temporarily storing second media data to be transmitted in a second buffer, a step of generating a packet-multiplexed frame of different types of media data, the frame having a data structure including a UDP header followed by a serial number portion, a first media data size portion, first media data having the length equal to the size contained in the first media data size portion, and second media data, a step of temporarily storing the frame generated in a third buffer, a step of demultiplexing the frame stored in the third buffer into a serial number portion, a first media data size portion, first media data having the length equal to the size contained in the first media data size portion, and second media data, a step of discarding the demultiplexed second media data, a step of regenerating a frame having a data structure including the demultiplexed serial number portion, the first media data size portion and the first media data having the length equal to the size contained in the first media data size portion, a step of inputting the remultiplexed frame into the third buffer, a step of monitoring the number of frames stored in the third buffer, and a step of instructing the second buffer to stop transferring the second media data and the third buffer to output frames stored in the third buffer when the number of frames exceeds a first threshold.

Further objects and advantages of the present invention will be apparent from the following description of the preferred embodiments of the invention as illustrated in the accompanying drawings.

DESCRIPTION OF THE PREFERRED EMBODIMENTS

Figure 3:
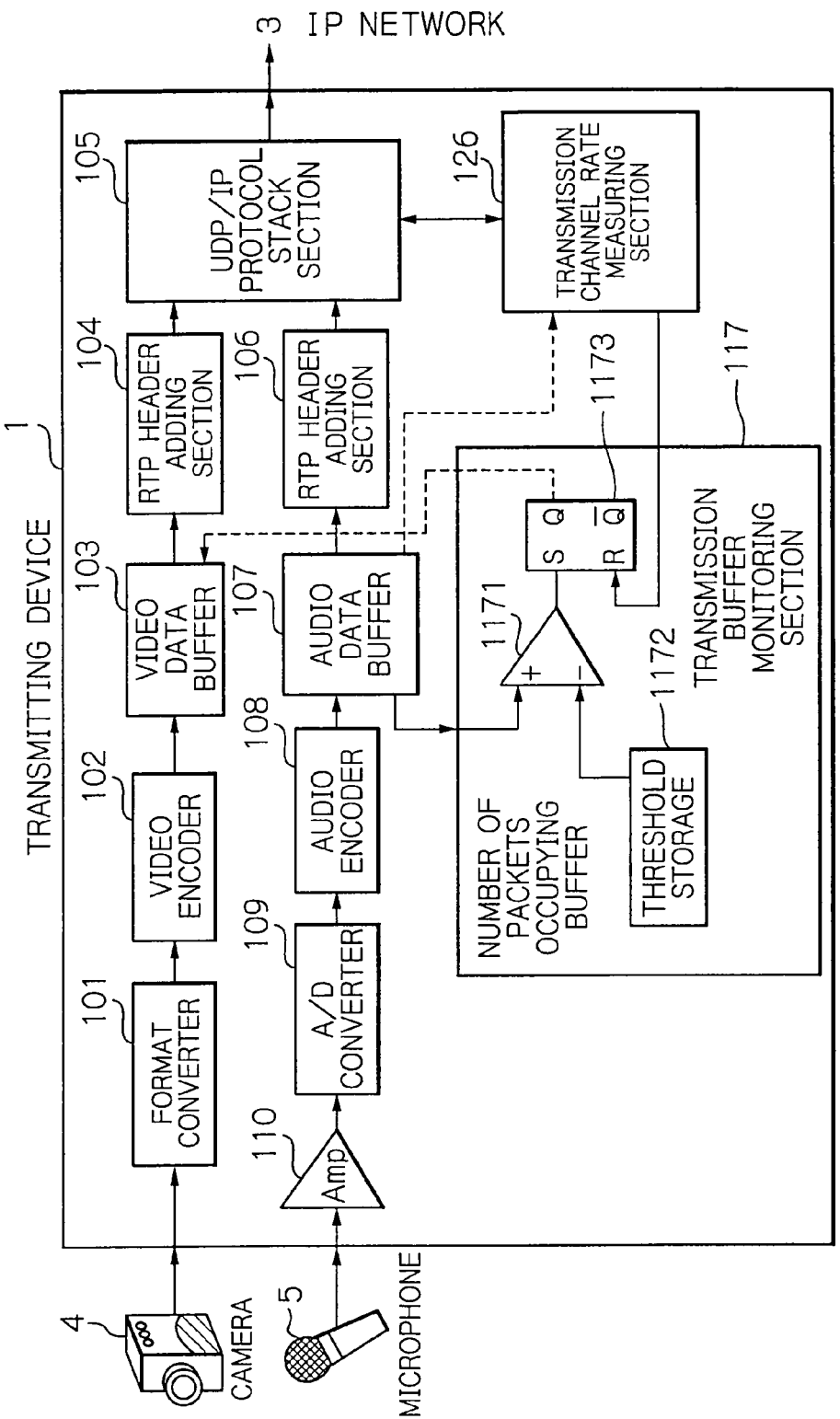
FIG. 3 is a block diagram illustrating a functional configuration of a transmitting device in a first embodiment according to the present invention.

FIG. 3 illustrates a functional configuration of a transmitting device in a first embodiment according to the present invention. It should be noted that functions of this embodiment can be implemented by a program as well. In that case, the functions are embodied by a computer executing the program.

Figure 1:
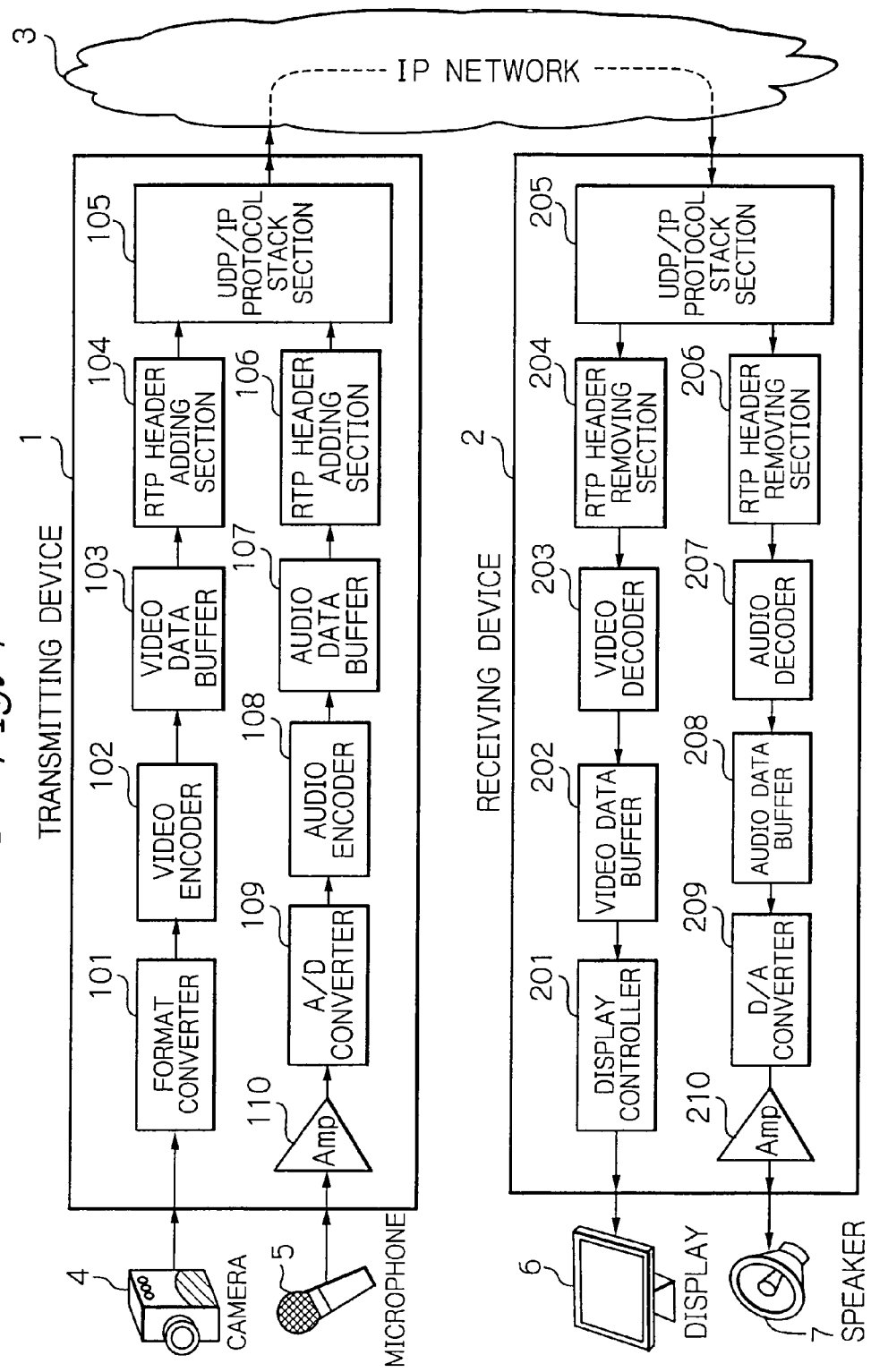
FIG. 1, already described, is a block diagram illustrating a functional configuration of the transmitting device for multiplexing packets and the receiving device according to the conventional art.

A transmitting device 1 encodes and transmits video and audio data in real time. A camera 4 for producing video signals and a microphone 5 for producing audio signals are connected to this transmitting device 1. This transmitting device 1 communicates with a receiving device shown as an example in FIG. 1 through an IP network 3.

The transmitting device 1 has, for processing video data, a format converter 101, a video encoder 102, a video data buffer 103, and an RTP (Real-time Transport Protocol) header adding section 104. For processing audio data, the transmitting device 1 has an amplifier 110, an (Analog/Digital) A/D converter 109, an audio encoder 108, an audio data buffer 107, and an RTP header adding section 106. Also, the transmitting device 1 has a UDP (User Datagram Protocol)/IP protocol stack section 105, which multiplexes multiple media data each having a UDP port number assigned, and outputs the multiplexed data to the IP network 3.

The transmitting device 1 further has a transmitting buffer monitoring section 117 and a transmission channel rate measuring section 126.

A video signal provided from the camera 4 is converted by the format converter 101 into a video format appropriate for compression encoding. The converted video signal is compression-encoded by the video encoder 102. This encoding scheme is to generate coded data of each frame (screen image) as a unit. An example of such encoding scheme is ISO/IEC (International Organization for Standardization/International Electrotechnical Commission) MPEG-4 (Moving Picture Experts Group-4) Visual. According to a low-bit-rate MPEG-4, each frame is generated every 100 milliseconds (10 frames per second). The generated bit stream data is provided to the video data buffer 103. The RTP header adding section 104 adds an RTP header to each frame of video data taken out of the buffer 103. UDP and IP headers are added to each of the RTP packets by the UDP/IP protocol stack section 105 and the packets are sent out to the IP network 3.

On the other hand, an audio signal from the microphone 5 is amplified by the amplifier 110 and converted by the A/D converter 109 into a transmittable bit string. The audio data is then compression-encoded by the audio encoder 108. The encoding scheme is to generate coded data of frames so that each frame has a predetermined time length. Examples of such encoding scheme include a 3GPP (3rd Generation Partnership Project) AMR (Adaptive Multi Rate). In the AMR, each frame is 20 milliseconds long. The generated bit stream is provided to the audio data buffer 107. The RTP header adding section 106 adds an RTP header to each frame of audio data taken out of the buffer 107. UDP and IP headers are added to each of the RTP packets by the UDP/IP protocol stack section 105 and the packets are sent out to the IP network 3.

The video data buffer 103 in this embodiment is controlled not only to transfer video data but also to discard stored video data. When the video data buffer 103 is instructed to discard video data, only audio data is provided to the UDP/IP protocol header stack section 105.

The transmission buffer monitoring section 117 includes a comparator 1171, a threshold storage 1172 and a flip-flop 1173. The threshold storage 1172 stores a threshold Th1 of the amount of data stored in the audio data buffer 107. The comparator 1171 compares the amount of buffered data stored in the audio data buffer 107 with the threshold Th1. If the amount of buffered data exceeds the threshold Th1, the video data buffer 103 is instructed to discard data.

The transmission channel rate measuring section 126 starts to measure a transmission channel rate when the amount of buffered data stored in the audio data buffer 107 is less than or equal to a threshold Th2 for a predetermined period of time TM. When the measured transmission channel rate recovers to a predetermined rate, a reset signal is sent to the transmission buffer monitoring section 117. One specific method for measuring the transmission channel rate is disclosed in commonly assigned Japanese patent publication No. 2004-289583A. This method measures a transmission channel rate on the basis of round-trip delay time obtained through exchange of two kinds of report packets with different sizes between a transmitting device and a receiving device.

The flip-flop 1173 of the transmission buffer monitoring section 117 is reset when a reset signal is provided from the transmission channel rate measuring section 126. In response to this, the transmission buffer monitoring section 117 instructs the video data buffer 103 to resume transferring video data.

The transmission buffer monitoring section 117 may be one that monitors only the video data buffer 103. In that case, the audio data buffer 107 is controlled so as to transfer audio data or discard stored audio data. The transmission buffer monitoring section 117 holds a threshold Th1 of the amount of buffered data stored in the video data buffer 103 and monitors the amount of buffered data stored in the video data buffer 103. The comparator 1171 inputs a reset signal into the flip-flop 1173 to instruct the audio data buffer 107 to discard audio data when the amount of buffered data stored in the video data buffer 103 exceeds the threshold Th1.

Figure 4:
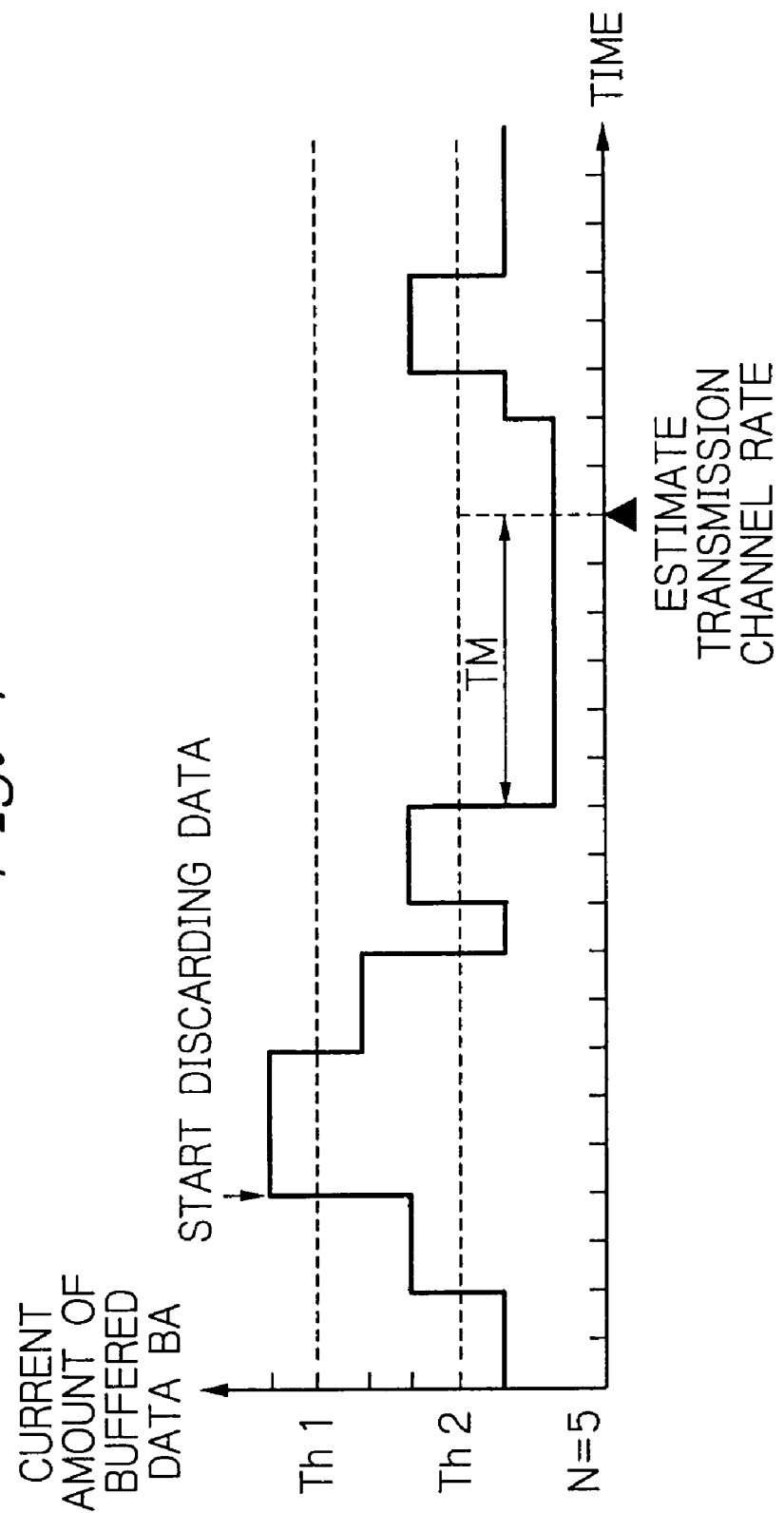
FIG. 4 is a graph illustrating changes in the amount of buffered data stored in an audio data buffer with time in the first embodiment.

FIG. 4 is illustrates changes in the amount of buffered data stored in the audio data buffer with time in this first embodiment. The vertical axis in this figure represents the current amount of buffered data and the horizontal axis represents time.

When the amount of data stored in the audio data buffer 107 exceeds threshold Th1, discard of video data stored in the video data buffer 103 is started. When the amount of buffered data stored in the audio data buffer 107 subsequently decreases to a value less than or equal to threshold Th2 and the predetermined period of time TM has elapsed under this condition, the transmission channel rate is measured. If the measured transmission channel rate is higher than or equal to a predetermined rate, the transmission channel rate is regarded as having recovered to an adequate level, and the discard of video data is stopped.

Figure 5:
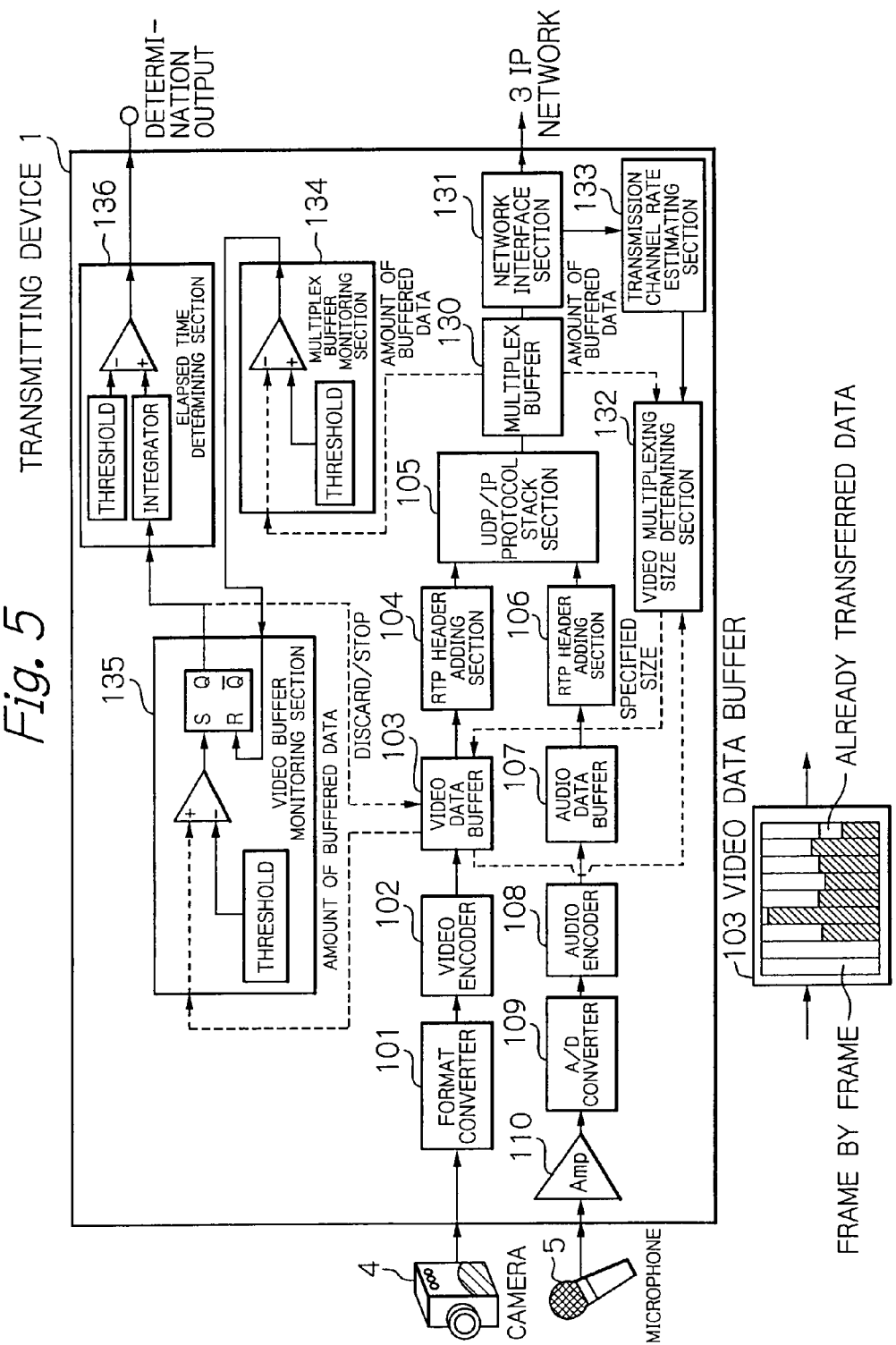
FIG. 5 is a block diagram illustrating a functional configuration of a transmitting device in a second embodiment according to the present invention.

FIG. 5 illustrates a functional configuration of a transmitting device in a second embodiment according to the present invention. It should be noted that functions of this embodiment can be implemented by a program as well. In that case, the functions are embodied by a computer executing the program.

A transmitting device 1 encodes and transmits video and audio data in real time. A camera 4 for producing video signals and a microphone 5 for producing audio signals are connected to this transmitting device 1. This transmitting device 1 communicates with a receiving device shown as an example in FIG. 1 through an IP network 3.

The transmitting device 1 has, for processing video data, a format converter 101, a video encoder 102, a video data buffer 103, and an RTP header adding section 104. For processing audio data, the transmitting device 1 has an amplifier 110, an A/D converter 109, an audio encoder 108, an audio data buffer 107, and an RTP header adding section 106. Also, the transmitting device 1 has a multiplex buffer 130 and a UDP/IP protocol stack section 105, which multiplexes multiple media data each having a UDP port number assigned, and outputs the multiplexed data to the multiplex buffer 130.

The transmitting device 1 further has a network interface section 131, a video multiplexing size determining section 132, a transmission channel rate estimating section 133, a multiplex buffer monitoring section 134, a video buffer monitoring section 135, and an elapsed time determining section 136.

An audio signal from the microphone 5 is amplified by the amplifier 110 and converted by the A/D converter 109 into a transmittable bit string. The audio data is then compression-encoded by the audio encoder 108. The encoding scheme is to generate coded data of frames so that each frame has a predetermined time length. Examples of such encoding scheme include a 3GPP AMR. In the AMR, each frame is 20 milliseconds long. The generated bit stream is provided to the audio data buffer 107. The RTP header adding section 106 adds an RTP header to a predetermined unit of audio data stored in the audio data buffer 107 and sends the data unit to the UDP/IP protocol stack section 105. The predetermined unit of data to which an RTP header is added is a 20 milliseconds frame in an AMR encoding algorithm. Off course, the predetermined unit may be a frame or a set of frames.

A video signal provided from the camera 4 is converted by the format converter 101 into a video format appropriate for compression encoding. The converted video signal is compression-encoded by the video encoder 102. This encoding scheme is to generate coded data of each frame (screen image) as a unit. An example of such encoding scheme is ISO/IEC MPEG-4 Visual. According to a low-bit-rate MPEG-4, each frame is generated every 100 milliseconds (10 frames per second). The generated bit stream data is provided to the video data buffer 103. The video data buffer 103 in this embodiment is controlled so as to transfer a specified amount of video data, or stop transferring video data, or discard stored video data.

The video data buffer 103 is controlled by the video multiplexing size determining section 132 to transfer or stop transferring a specified size of data, and controlled by instructions from the video buffer monitoring section 135 to discard or stop to discard data. The RTP header adding section 104 adds an RTP header to video data sent from the video data buffer 103 and sends the data to the UDP/IP protocol stack section 105.

The UDP/IP protocol stack section 105 constructs an IP frame from an RTP frame and sends the frame to the multiplex buffer 130. The multiplex buffer 130 buffers frames sent from the UDP/IP protocol stack section 105.

The network interface section 131 extracts frames from the multiplex buffer 130 and transmits them to the IP network 3. The network interface section 131 transmits the frames at a transmission channel rate specified in the system (predetermined time intervals) to the IP network. The transmission intervals and the size of data transmitted at a time depend on the system. The network interface section 131 outputs transmission state parameters such as the size of previously transmitted data, a congestion state and a maximum size limiting value to the transmission channel rate estimating section 133.

For example, in cdma 2000 1xEV-DO, the third generation mobile phone system, parameters are specified as shown in Table 2.

TABLE 2

| | |
|---|---|
| Frame Transmission Rate | 37.5 times/second |
| Frame Transmission Interval | 26.6 milliseconds |
| Transmission Size at One Time (selecting one of them) | 256 bits |
| | 512 bits |
| | 1024 bits |
| | 2048 bits |
| | 4096 bits |

The transmission channel rate estimating section 133 estimates a transmission channel rate by taking into consideration the current conditions of the transmission channel. The transmission channel rate estimating section 133 obtains transmission channel state parameters through the network interface section 131. Based on the transmission channel state parameters, the maximum transmittable size for the next transmission is calculated. The next transmission size is provided to the video multiplexing size determining section 132. The following transmission channel state parameters may be as given below:

(1) immediately previous transmission size,
(2) congestion status flag, and
(3) maximum size limiting value.

The transmission channel rate estimating section 133 selects one of the five transmission sizes by taking into consideration four conditions as described below for example:

(1) A size is set to a value large enough for transmitting the frames stored in the multiplex buffer 130,
(2) A size is set to a value one level greater than the size of immediately previously transmitted data if a congestion state flag obtained through the network interface section 131 indicates a non-congestion state,
(3) A size is to a value one level smaller than the size of immediately previously transmitted data if the congestion state flag indicates a congestion state, and
(4) A size is set to a value smaller than or equal to the maximum size if a value limiting the maximum size is determined by the network interface section 131.

The smallest one of these sizes is selected as the size of data to be transmitted next.

For example, if
size of data immediately previously transmitted=1024 bits,
congestion state flag=off, and
maximum size limiting value=none, then the maximum transmittable size for the next transmission is set to 2048 bits.

For another example, if
size of data immediately previously transmitted=2048 bits,
congestion state flag=on, and
maximum size limiting value=none, then the maximum transmittable size for the next transmission is set to 1024 bits.

The video multiplexing size determining section 132 determines the size of data to be transferred from the video data buffer 103. The video multiplexing size determining section 132 instructs the video data buffer 103 to transfer the specified size of video data.

The video multiplexing size determining section 1332 obtains the following three items of information:

Sf; the maximum transmittable size for the next transmission estimated by the transmission channel rate estimating section 133, Sm; the amount of buffered data stored in the multiplex buffer 130, and Sv; the data size of the oldest array element stored in the video data buffer 103.

The following parameters are also defined:
Sh; the size of the protocol header to be added, and
Sx; a specified size to be indicated to the video data buffer 103.

The video multiplexing size determining section 132 determines the value of Sx immediately before the next data is transmitted, as follows.

(1) If Sf−Sm<Sh, then Sx=0. Namely, if the multiplex buffer contains a sufficient amount of data, the video data buffer 103 does not transfer video data.

(2) If Sf−Sm≧Sh, then determination is made depending on the cases below. Namely, the video data buffer 103 transfers video data in accordance with the value of Sx given as follows.

(2-1) If (Sf−Sm−Sh)<Sv, then Sx=Sf−Sm−Sh. In this case, because the data size of a video frame to be transmitted is sufficient, the necessary amount of the video frame is extracted from the buffer.

(2-2) If (Sf−Sm−Sh)≧Sv, then Sx=Sv. In this case, because the data size of a video frame to be transmitted is smaller than required, the whole video frame is transferred.

As shown at the bottom of FIG. 5, stored in the video data buffer 103 is an array of access units, each of which is data to be decoded and played back as a unit. Data is extracted from the video data buffer 103, starting from the top of an access unit. When the end of the access unit is reached during extraction of the data, the extraction finishes temporarily regardless of the value of Sx determined as described above. Accordingly, a header of a video frame (for example the VOP header in the case of MPEG-4) is placed in the top of the payload of an IP packet.

The video buffer monitoring section 135 instructs the video data buffer 103 to discard or stop to discard video data, on the basis of the buffered amount of data stored in the video data buffer 103. For example, if the amount of buffered data stored in the video data buffer 103 exceeds a predetermined threshold Th4 due to a reduction in the transmission channel rate, then the comparator in the video buffer monitoring section 135 outputs the ON signal, which sets the flip-flop to provide a discard to the video data buffer 103. Then, the discard state continues.

When instructed to discard, the video data buffer 103 discards the data in the buffer, except the oldest access unit. Then, the video data buffer 103 also continue discarding data provided to the video data buffer 103, therefore no video data is newly stored.

The multiplex buffer monitoring section 134 monitors the amount of buffered data stored in the multiplex buffer 130. If the amount of buffered data stored in the multiplex buffer 130 is less than another predetermined threshold Th5, the multiplex buffer monitoring section 134 inputs the "H" level signal into the video buffer monitoring section 135. This "H" level signal functions as a reset signal resetting the flip-flop of video buffer monitoring section 135.

When the flip-flop of the video buffer monitoring section 135 receives the "H" signal from the multiplex buffer monitoring section 134 while video data in the video data buffer 103 is being discarded, the flip-flop is reset. In response to this, the video buffer monitoring section 135 instructs the video data buffer 103 to discontinue the discard operation.

The elapsed time determining section 136 monitors the duration of an output signal from the video buffer monitoring section 135. The elapsed time determining section 136 detects the state in which the output signal of the video buffer monitoring section 135 is high, which indicates discard of video data, and remains high for a period longer than a time threshold Th6. Under this state of the transmission channel, communication simultaneously using both video and audio can no longer be performed. In that case, therefore, a signal for terminating the communication application is provided to the outside.

Figure 6:
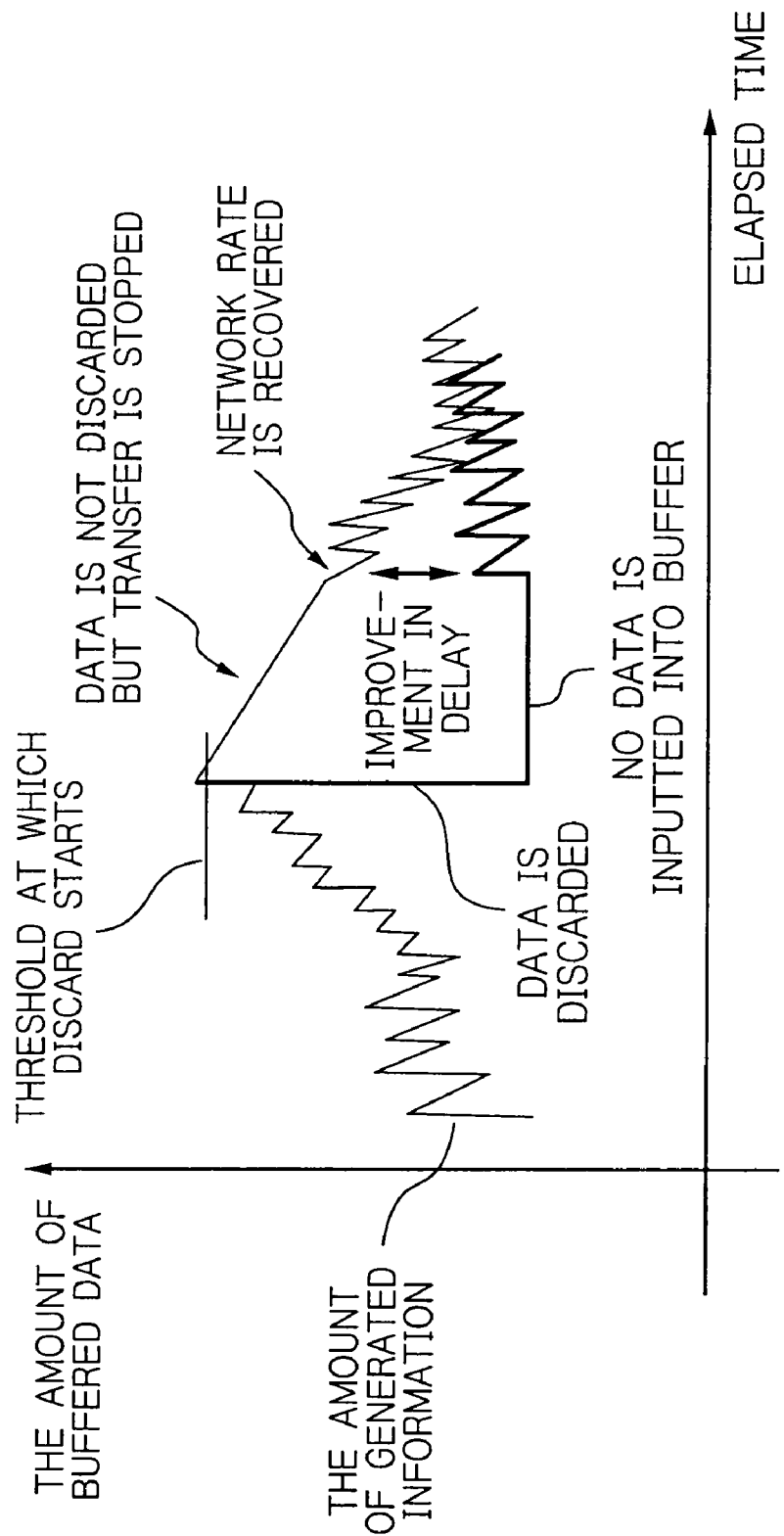
FIG. 6 illustrates changes in the amount of buffered data stored in a video data buffer in the second embodiment.

FIG. 6 illustrates transition in the amount of buffered data stored in the video data buffer 103 in this embodiment and a conventional method.

When the transmission channel rate is higher than the bit rate of data (audio and video data) to be transmitted, the amount of buffered data stored in the audio data buffer 107 decreases. On the other hand, when the transmission channel rate is lower than the bit rate of data to be transmitted, the amount of data coming from the buffer 107 is larger than the amount of data provided to the buffer 107 and therefore the amount of buffered data stored in the buffer 107 increases.

In the transition diagram shown in FIG. 6, the horizontal axis represents elapsed time and the vertical axis represents the video buffer level. The thick and thin lines represent the amount of buffered data stored in the video buffer versus elapsed time. The thick line represents changes in the amount of buffered data when video data is discarded in response to a reduction in the transmission channel rate. The thin line represents changes in the amount of buffered data when data transfer to the video data buffer is merely stopped in response to a reduction in the transmission channel rate.

In normal operation, the buffer level rises perpendicularly when a frame of the data is coming from the video encoder. Then, the buffer level decreases because data is being extracted from the buffer until the completion of encoding of the next frame. This is repeated and the line appears a sawtooth curve. Subsequently, the rate of extraction decreases as the transmission channel rate decreases, and therefore the buffer level gradually increases. Here, operation performed when the amount of buffered data stored in the video buffer 103 exceeds the threshold Th4 differs depending on whether video data in the video data buffer 103 is discarded as this second embodiment (represented by the thick line in the figure) or data transfer to the video buffer is simply stopped as in the conventional manner without discarding data (represented by the thin line).

If the data transfer to the video buffer is simply stopped, video data previously stored is remained after the transmission channel rate is recovered. Therefore, data transfer is resumed at a high buffer level of the multiplex buffer 130 when subsequently the video data is extracted. According to this second embodiment, on the other hand, transmission of coded data can be resumed at a low buffer level after the rate of the transmission channel is recovered, because data in the buffer has been discarded and additional data is not stored in the buffer after the buffer level of the video buffer has exceeded the threshold Th4. Thus, delay in transmission of video data after the transmission rate is recovered can be significantly improved.

Hereinafter, a third embodiment according to the present invention will be described in which different types of media data is constructed into a single frame.

Table 3 shows a data structure of a packet-multiplexed frame used in this third embodiment.

TABLE 3

| IP Header 20 bytes | UDP Header 8 bytes | Ser. No. 1 byte | Voice Data Size 1 byte | Voice Data | Video Data |
|---|---|---|---|---|---|

Referring to Table 3, the data structure of a frame in this embodiment includes a UDP header followed by a 1-byte-long serial number portion, a 1-byte-long audio data size portion, audio data having the length equal to the size contained in the data size portion, and video data. Thus, unlike the one shown in Table 1, the data structure shown in Table 3 does not require an RTP header. The serial number portion is an unsigned integer that is a cyclic value ranging from 0 to 255. The audio data size portion is 1 byte long. The size of the audio data ranges from 0 to 255 bytes.

Figure 7:
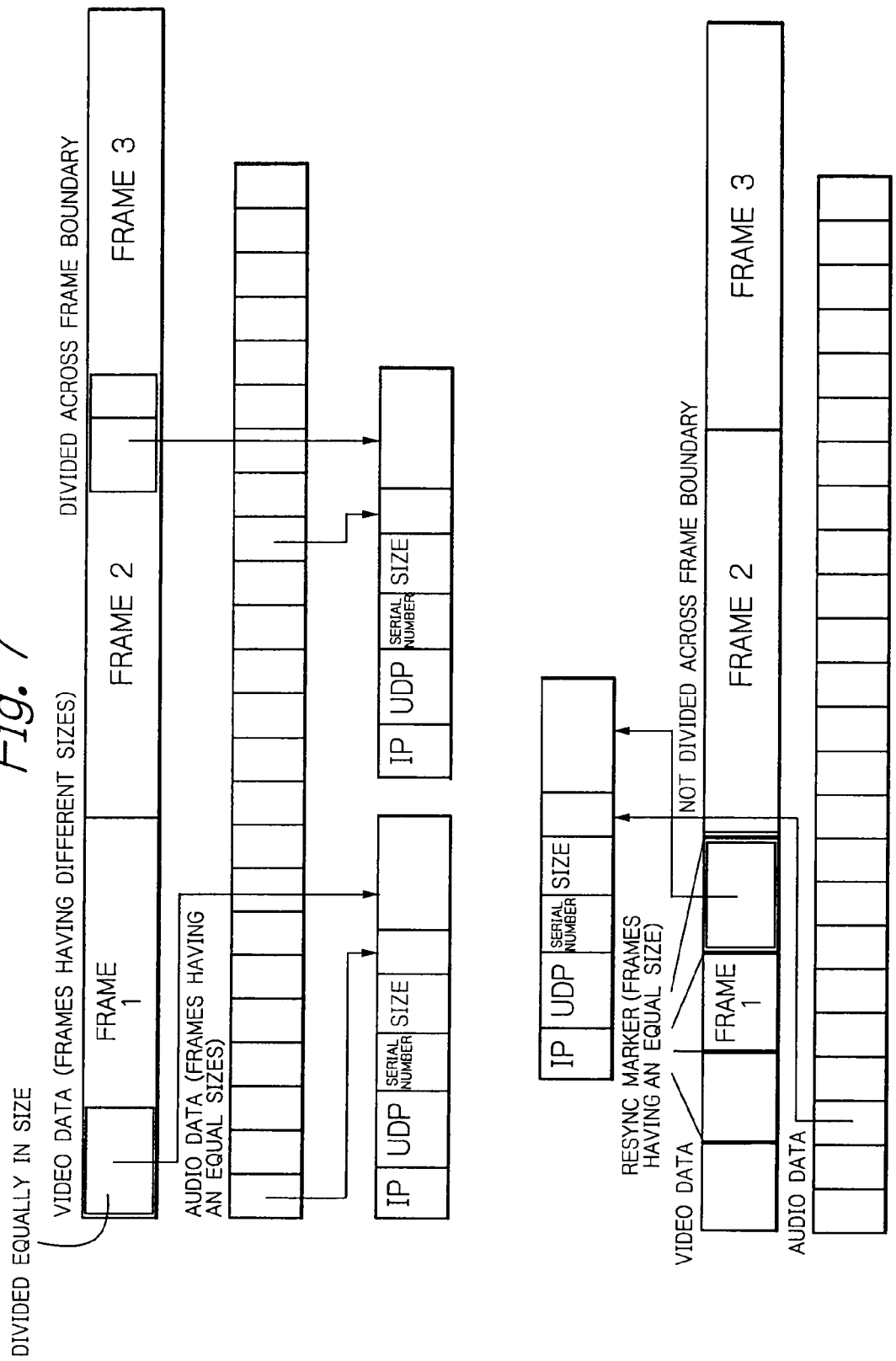
FIG. 7 illustrates a media division structure of packet-multiplexed frames in a third embodiment according to the present invention.

FIG. 7 illustrates a media division structure of packet-multiplexed frames in this embodiment.

Shown in the upper part of FIG. 7 are packet-multiplexed frames generated by equally dividing video data. This structure can be easily implemented because video data is always divided by a predetermined number of bytes. However, in some cases, video data may be divided across the boundary between one video frame and another. In such a case, if a packet containing video data of portions over the two video frames is lost during transmission, the packet loss affects the two consecutive frames.

Shown in the lower part of FIG. 7 is a structure in which Resync markers are inserted between video frames for resynchronization specified in MPEG 4. A Resync marker is a bit string having a particular pattern indicating the boundary between variable-length code words. The Resync markers are inserted at macroblock boundaries during encoding. If a frame loss occurs, decoding can be restarted from the Resync marker to be played back at the midpoint in the stream where the loss has occurred. The Resync markers are inserted at intervals of a substantially equal size so that video data between the Resync markers is contained in a multiplexed frame. This prevents video data from being divided across a video frame boundary. That is, a loss of a single multiplexed frame does not affect two video frames.

Figure 8:
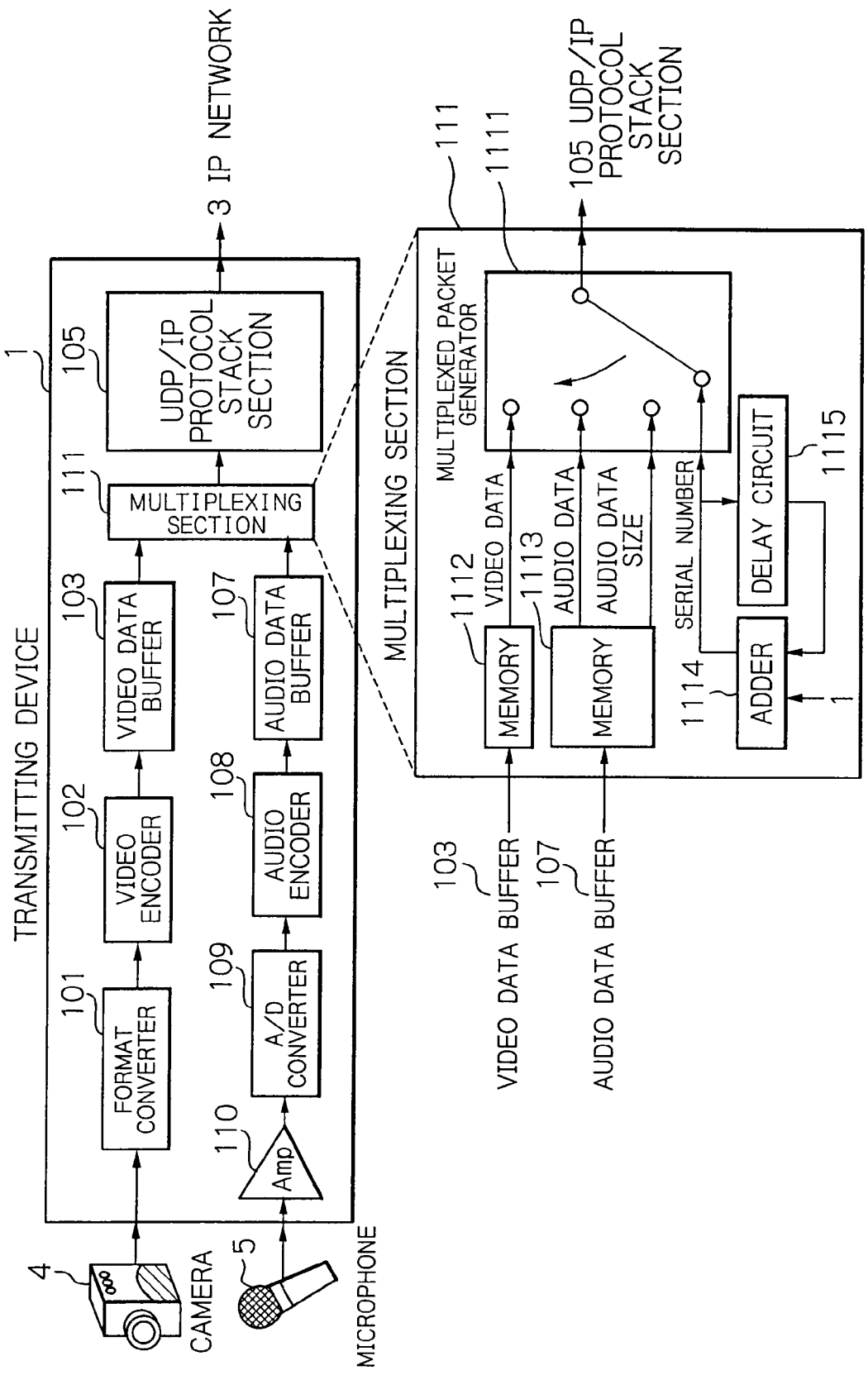
FIG. 8 is a block diagram illustrating a functional configuration of a transmitting device in the third embodiment.

FIG. 8 illustrates a functional configuration of a transmitting device in the third embodiment. It should be noted that the functions can be implemented by a program as well. In that case, the functions are embodied by a computer executing the program.

A transmitting device 1 encodes and transmits video and audio data in real time. A camera 4 for producing video signals and a microphone 5 for producing audio signals are connected to this transmitting device 1. This transmitting device 1 communicates with a receiving device shown as an example in FIG. 1 through an IP network 3.

The transmitting device 1 has, for processing video data, a format converter 101, a video encoder 102, and a video data buffer 103. For processing audio data, the transmitting device 1 has an amplifier 110, an A/D converter 109, an audio encoder 108, and an audio data buffer 107. Also, the transmitting device 1 has a multiplexing section 111 and a UDP/IP protocol stack section 105 that attaches UDP/IP header to the multiplexed data and outputs the attached multiplexed data to the IP network 3.

A video signal provided from the camera 4 is converted by the format converter 101 into a video format appropriate for compression encoding. The converted video signal is compression-encoded by the video encoder 102. This encoding scheme is to generate coded data of each frame (screen image) as a unit. An example of such encoding scheme is ISO/IEC MPEG-4 Visual. According to a low-bit-rate MPEG-4, each frame is generated every 100 milliseconds (10 frames per second). The generated bit stream data is provided to the video data buffer 103.

An audio signal from the microphone 5 is amplified by the amplifier 110 and converted by the A/D converter 109 into a transmittable bit string. The audio data is then compression-encoded by the audio encoder 108. The encoding scheme is to generate coded data of frames so that each frame has a predetermined time length. Examples of such encoding scheme include a 3GPP AMR. In the AMR, each frame is 20 milliseconds long. The generated bit stream is provided to the audio data buffer 107.

The multiplexing section 111 has a multiplexed packet generator 1111, a memory 1112 for temporarily storing video data, a memory 1113 for temporarily storing audio data, an adder 1114 which generates serial numbers, and a delay circuit 1115. The audio data memory 1112 outputs the size of audio data (the difference between a write pointer and a read pointer), which is represented by a value ranging from 0 to 255 in bytes.

When audio data is stored in the memory 1113 and/or video data is stored in the memory 1112, the multiplexed packet generating section 1111 constructs a frame shown in Table 3. The multiplexed packet generating section 1111 has 4-input 1-output switch and switches its input among the serial number, audio data size, audio data, and video data, in this order. One frame is constructed by one cycle of switching. The serial number is provided to the adder 1114 through the delay circuit 1115. The adder 1114 increments the serial number by 1 (adds 1 to the serial number) to output a new serial number.

Video data and audio data are extracted from the buffer 103 and 107 at the same timing and multiplexed into one frame. Thus, delay in arrival of the video and audio data can be kept the same. Furthermore, jitter in arrival of audio data at a receiving device can be avoided.

Although, in the conventional art, each of video and audio data packets requires a 12-byte-long RTP header, in contrast, video data and audio data are integrated and the length of the header equivalent to the RTP header is 2 bytes in this embodiment. Thus, the header size is reduced.

For example, if packets are transmitted at intervals of 20 milliseconds, overhead is 32 kilobits/second in the conventional art. Whereas in this embodiment, in contrast, it is 12 kilobits/second, as follows:

(2 bytes+8 bytes+20 bytes)×8 bits×50=12 kilobits/second.

Therefore, according to this embodiment, overhead can be reduced by as large as 20 kilobits/second. The number of bits of the reduced overhead can be allocated to the video or audio data encoding bit rate, thereby improving the quality of the encoding.

Figure 9:
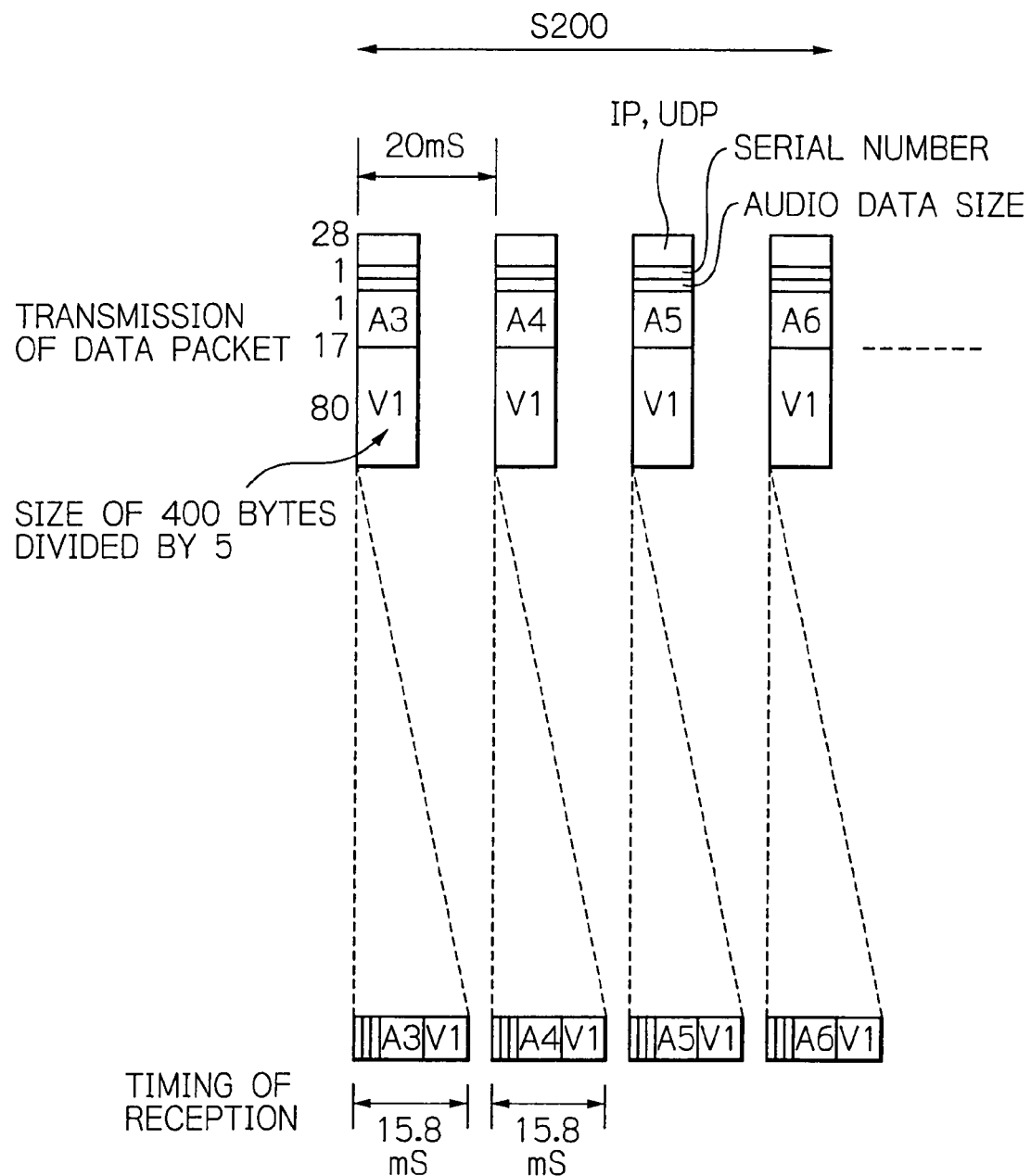
FIG. 9 shows a frame transmission sequence in the transmitting device in the third embodiment shown in FIG. 8.

FIG. 9 illustrates a frame transmission sequence in the transmitting device shown in FIG. 8.

Figure 2:
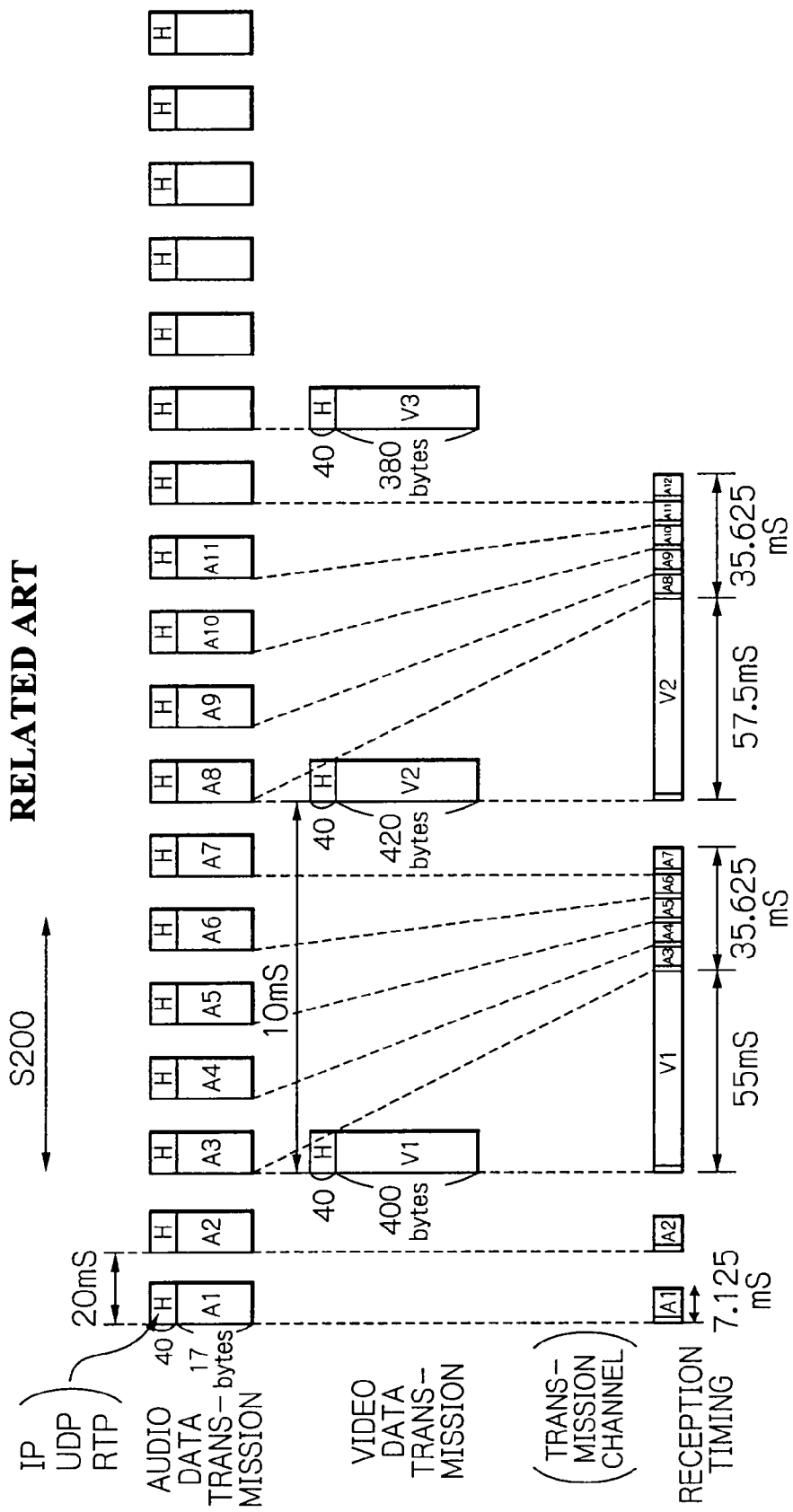
FIG. 2, already described, illustrates the data packet transmission sequence according to the conventional art.

This figure corresponds to the portion indicated by S200 in FIG. 2. In this embodiment, a data structure is used in which different types of media data are integrated into one multiplexed frame. If multiplexed packets are transmitted every 20 milliseconds, which are transmission intervals of audio data packets, then video data shorter than the video data packet shown in FIG. 2 will be transmitted. In this embodiment, as shown in FIG. 9, a frame consisting of 17 bytes of audio data and 80 bytes of video data is received at the receiving device in 15.8 milliseconds. That is, the end of reception of video data V1 (400 bytes) coincides with the end of reception of audio data A1 to A4 (17 bytes×4).

For example, the size of AMR audio data in bytes will be as given below if packets are transmitted at intervals of 20 milliseconds. Here, the sizes in three typical modes are listed:

4.75 kilobits/second mode: 14 bytes,
*6.70 kilobits/second mode: 19 bytes,
12.2 kilobits/second mode: 33 bytes.

The size of video data can be represented simply by "bit rate×time". If one packet is 20 milliseconds long, then the size of the video data is as follows:

32 kilobits/second: 32 kilobits/8 bits×20 milliseconds=80 bytes.

If AMR uses 6.70 kilobits/second mode, a multiplexed frame, which consists of 1 byte of serial number, 1 byte of audio data size, and 19 bytes of audio data and 80 bytes of video data, requires 101 bytes in total.

The video data and audio data are extracted from the buffers at the same time, multiplexed into one frame, and transmitted. This enables delay in arrival of video data and audio data to be the same, thereby avoids the jitter in arrival of audio data at the receiving device. In conventional art or another embodiment, each of a video packet and an audio packet has required 12 bytes for the RTP header. In this embodiment, in contrast, packets of different types of media data are integrated and the length of the header equivalent to the RTP header is reduced to 2 bytes. Thus, the header size can be significantly reduced and accordingly the efficiency of transmission can be increased.

Figure 10:
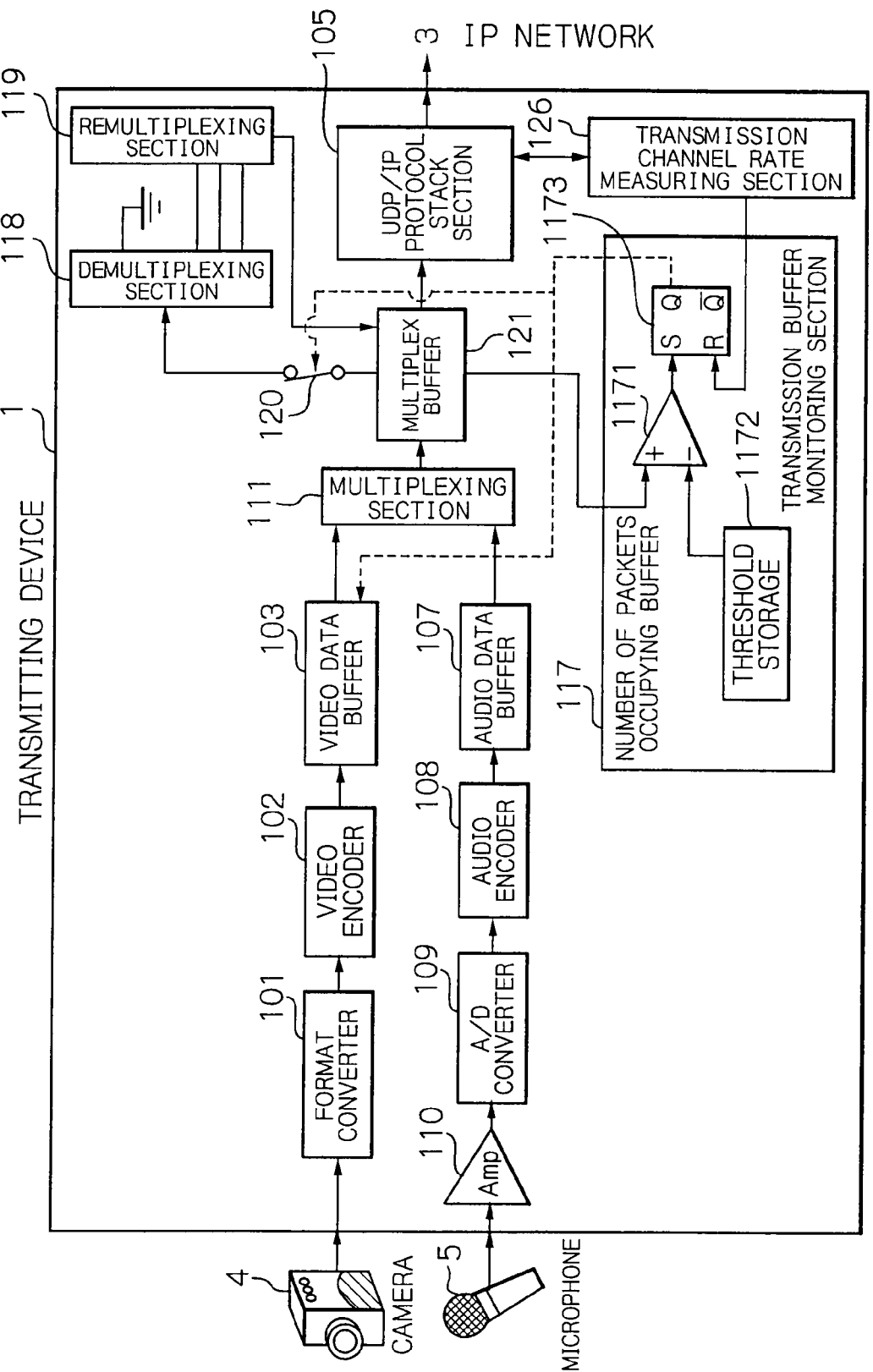
FIG. 10 is a block diagram illustrating a functional configuration of a transmitting device in a fourth embodiment according to the present invention.

FIG. 10 illustrates a functional configuration of a transmitting device in a fourth embodiment according to the present invention. It should be noted that functions of this embodiment can be implemented by a program as well. In that case, the functions are embodied by a computer executing the program.

When compared with the third embodiment shown in FIG. 8, the transmitting device 1 of the fourth embodiment shown in FIG. 10 additionally includes a switch 120, a multiplex buffer 121, a demultiplexing section 118, a remultiplexing section 119, a transmission buffer monitoring section 117 and a transmission channel rate measuring section 126.

The transmission buffer monitoring section 117 monitors the number of multiplexed packets stored in a multiplex buffer 121 and is capable of control the switch 120. The transmission buffer monitoring section 117 also holds a threshold of the number of multiplexed packets in the multiplex buffer 121. If the number of multiplexed packets stored in the multiplex buffer 121 exceeds the threshold, the transmission buffer monitoring section 117 stops transfer of video data from the video data buffer 103. This stops input of video data into the multiplexing section 111 and the switch 120 is controlled to be turned on to allow multiplexed packets to be provided from the multiplex buffer 121 to the demultiplexing section 118.

The transmission channel rate measuring section 126 measures a transmission channel rate. When the measured transmission channel rate recovers to a predetermined rate, a reset signal is sent to the transmission buffer monitoring section 117.

The demultiplexing section 118 demultiplexes all multiplexed packets stored in the multiplex buffer 121. The demultiplexed video data is discarded. The remultiplexing section 119 remultiplexes the demultiplexed serial number, audio data size portion, and audio data. The remultiplexed packets are returned to the multiplex buffer 121.

Figure 11:
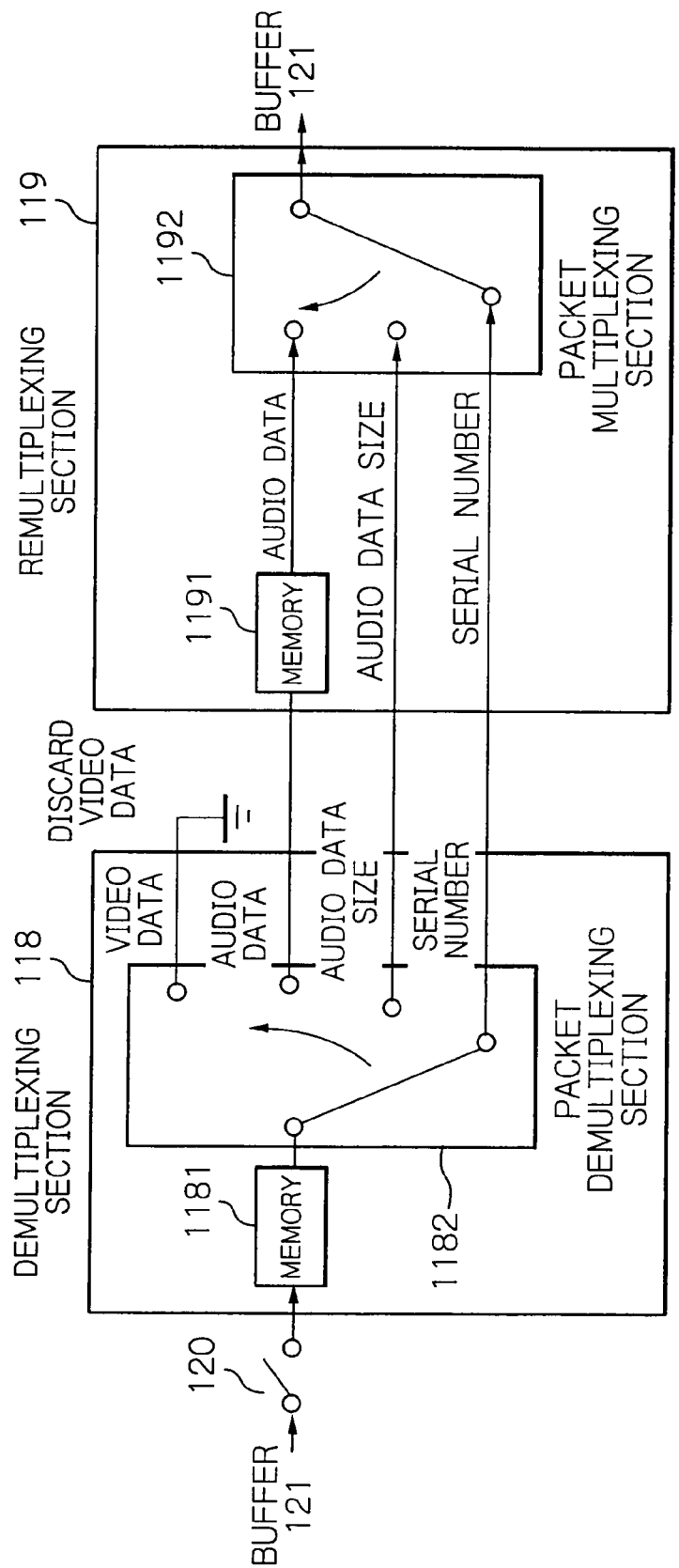
FIG. 11 illustrates a functional configuration of a demultiplexing section and a remultiplexing section in the fourth embodiment.

FIG. 11 illustrates a functional configuration of the demultiplexing section and the remultiplexing section in this embodiment. By the use of the frame data structure shown in Table 2, demultiplexing and remultiplexing can be readily implemented as follows.

The demultiplexing section 118 has a memory 1181 and a packet demultiplexer 1182. The memory 1181 temporarily stores multiplexed packets provided from the multiplex buffer 121. The packet demultiplexer 1182 demultiplexes a multiplexed packet taken from the memory 1181 into a 1-byte-long seal number portion, a 1-byte-long audio data size portion, audio media data having the length equal to the size contained in the data size portion and video media data. The demultiplexed video media data is discarded. The serial number, the audio media data size portion, and the audio media data are provided to the remultiplexing section 119.

The remultiplexing section 119 has a memory 1191 and a packet multiplexer 1192. The memory 1191 temporarily stores audio media data received from the demultiplexing section 118. The packet multiplexer 1192 multiplexes a 1-byte-long serial number portion, a 1-byte-long audio data size portion, and audio data provided from the demultiplexing section 118.

Figure 12:
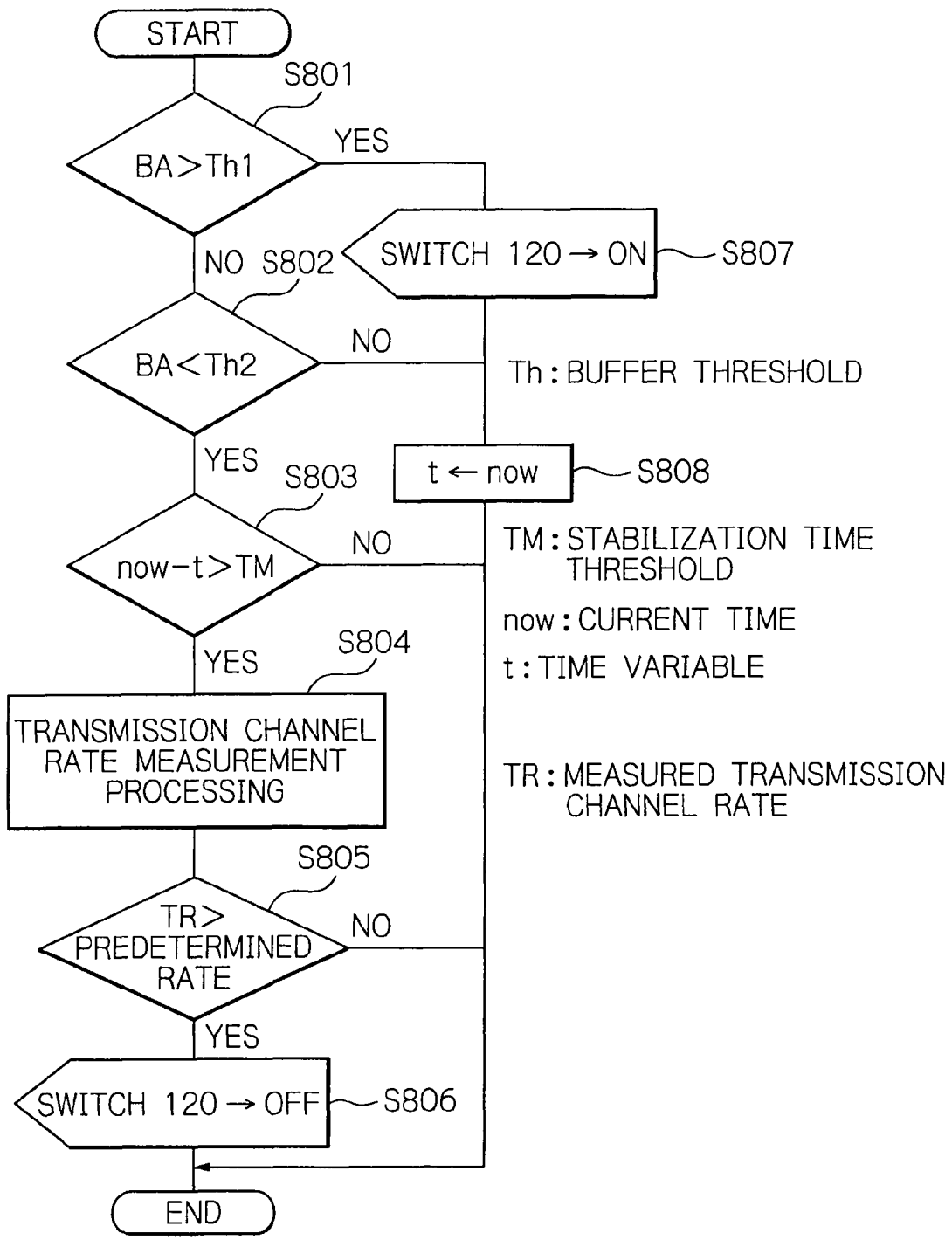
FIG. 12 is a flowchart illustrating operations of the transmitting device in the fourth embodiment.

FIG. 12 illustrates operations of the transmitting device in this embodiment.

(S801) Judgment is made as to whether or not the amount of buffered data BA stored in the audio data buffer 107 is greater than threshold Th1.

(S807) If BA is greater than Th1, then control is performed so that data transfer from the video data buffer 103 is stopped, data input into the multiplexing section 111 is stopped, and the switch 120 is turned on to allow frames stored in the buffer 121 to be provided to the demultiplexing section 118.

(S802) If BA is less than or equal to Th1, judgment is made as to whether or not the amount of buffered data BA stored in the audio data buffer 107 is less than threshold Th2. If BA is not less than Th2, the current time "now" is assigned to a time variable "t" (S809), and then the process will end.

(S803) If BA is less than Th2, judgment is made as to whether or not the time interval obtained by subtracting past time "t" from the current time "now" is longer than a predetermined time interval TM. If it is shorter than TM, the process will end. The time interval TM is the amount of time for determining whether the transmission channel rate has been recovered. For example, if an actual transmission channel rate is in the order of 80 kilobits/second, then the time interval TM is set to approximately 5 seconds.

(S804) If the time interval is longer than the predetermined time interval TM, it is determined that the transmission is stable, and transmission channel rate measurement processing is performed.

(S805) Judgment is made as to whether or not the transmission channel rate TR measured by the transmission rate measurement processing is greater than a given rate indicative of the recovery of transmission channel rate. If TR is less than or equal to the given rate, the process will end.

(S806) If the transmission channel rate TR is greater than the given rate, the video data buffer 103 is instructed to resume transferring video data. As a result, data input into the multiplexing section 111 is resumed and the switch 120 is turned off to allow frames stored in the buffer 121 to be transmitted.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A transmitting device comprising:
   a first buffer configured to temporarily store a first media data to be transmitted;
   a second buffer configured to temporarily store a second media data to be transmitted;
   a multiplexing means for multiplexing the first media data coming from said first buffer and the second media data coming from said second buffer to output a multiplexed data onto a single signal channel;
   a transmission buffer monitoring means for monitoring an amount of a first buffer data stored in said first buffer and, when the amount of the first buffer data exceeds a first threshold, instructing said second buffer to discard the second media data, such that only the first buffer data is received by the multiplexing means; and
   a transmission rate measuring means configured to measure a transmission channel rate when the amount of the first buffer data has exceeded the first threshold and when the amount of the first buffer data is less than or equal to a second threshold for a predetermined time,
   wherein said transmission buffer monitoring means instructs said second buffer to stop discarding the second media data when the transmission channel rate reaches a value higher than or equal to a predetermined transmission rate, such that data from the first buffer and the second buffer is received by the multiplexing means.

2. The transmitting device as claimed in claim 1, wherein the first media data is audio data and the second media data is video data.

3. A transmitting device comprising:
   a first buffer configured to temporarily store a first media data to be transmitted;
   a multiplexing means for multiplexing a first buffer data and a second media data to output frames onto a single signal channel;
   a second buffer configured to temporarily store the frames coming from the multiplexing means;
   a network interface means for transmitting frames coming from said second buffer to a network;
   a transmission channel rate estimating means for estimating a transmission channel rate and for determining a maximum transmittable size of a next transmission on the basis of transmission channel parameters obtained from said network interface means; and
   a multiplexing size determining means for monitoring an amount of a second buffer data stored in said second buffer and, when the amount of the second buffer data is less than the maximum transmittable size, controlling said first buffer to transfer an amount of the first buffer data, which is equivalent to the difference between the amount of the second buffer data and the maximum transmittable size,
   wherein the transmission channel parameters include an immediately preceding transmission size, a network congestion status flag, and a maximum size limiting value.

4. The transmitting device as claimed in claim 3, further comprising a buffer monitoring means for monitoring an amount of the first buffer data and, when the amount of the monitored first buffer data exceeds a first threshold based on the maximum transmittable size, for instructing said first buffer to discard the first media data.

5. The transmitting device as claimed in claim 3, wherein the first media data is audio data and the second media data is video data.

6. The transmitting device as claimed in claim 4, further comprising a multiplex buffer monitoring means for monitoring the amount of the second buffer data and, when the amount of the monitored second buffer data becomes less than a second threshold, for outputting a reset signal to said buffer monitoring means, which instructs said first buffer to stop discarding the first media data.

7. The transmitting device as claimed in claim 4, wherein said first buffer includes an array of access units and wherein said first buffer, when discarding the data stored therein, keeps an oldest access unit and discards the access units that follow the oldest access unit.

8. The transmitting device as claimed in claim 4 further comprising an elapsed time determining means for outputting an elapsed time indication to an external destination that equals an amount of time in excess of a predetermined threshold time while the first buffer is discarding first media data.

9. A transmitting device comprising:
- a first buffer configured to temporarily store a first media data to be transmitted;
- a second buffer configured to temporarily store a second media data to be transmitted;
- a multiplexing means for generating a packet-multiplexed frame of different types of media data, said packet including a data structure including a UDP header followed by a serial number portion, a first media data size portion, a first media data with a length equal to a size contained in the first media data size portion, and the second media data;
- a third buffer configured to temporarily store the frame generated by said multiplexing means;
- a packet demultiplexing means for demultiplexing the frame stored in said third buffer into a demultiplexed serial number portion, the first media data size portion, the first media data with the length equal to the size contained in the first media data size portion, and a demultiplexed second media data, and for discarding the demultiplexed second media data;
- a remultiplexing means for regenerating a remultiplexed frame including a data structure including the demultiplexed serial number portion, the first media data size portion, and the first media data with the length equal to the size contained in the first media data size portion and for inputting the remultiplexed frame into said third buffer;
- a switch connected between said third buffer and said packet demultiplexing means; and
- a transmission buffer monitoring means for holding a first threshold for said third buffer, for monitoring a number of frames stored in said third buffer, for instructing said second buffer to stop transferring the second buffer data when the number of frames exceeds the first threshold, and for controlling said switch to be turned on such that frames stored in said third buffer are input into said packet demultiplexing means.

10. The transmitting device as claimed in claim 9, further comprising a transmission rate measuring means configured to measure a transmission rate when the number of frames stored in said third buffer has exceeded a first threshold and when the number of frames stored in said third buffer is less than or equal to a second threshold for a predetermined time TM, and wherein, when the transmission channel rate reaches to a value higher than or equal to a predetermined rate, said transmission buffer monitoring means instructs said second buffer to resume transferring the second buffer data so as to cause said third buffer to stop discarding frames stored therein and controls said switch to be turned off such that frames are not inputted into said packet demultiplexing means.

11. The transmitting device as claimed in claim 9, wherein said multiplexing means comprises:
- an adding means for providing the serial number;
- a first memory configured to temporarily store the first media data;
- a second memory configured to temporarily store the second media data; and
- a multiplexed-packet generating means for repeating generation of a multiplexed packet by containing the serial number provided from said adding means in said serial number portion of said frame, then by containing a first media data size provided from said first memory in said first media data size portion of said frame, then by containing the first media data provided from said first memory and including the length equal to the size contained in said first media data size portion in said frame, and then by containing the second media data provided from said second memory in said frame.

12. The transmitting device as claimed in claim 9, wherein the first media data is audio data and the second media data is video data.

13. A method for causing a computer to function as a transmitting device, said method comprising the steps of:
- temporarily storing a first media data to be transmitted in a first buffer;
- temporarily storing a second media data to be transmitted in a second buffer;
- multiplexing the first media data coming from said first buffer and the second media data coming from said second buffer onto a single signal channel so as to output;
- monitoring an amount of first buffer data stored in said first buffer;
- instructing said second buffer to discard the second media data when the amount of the first buffer data exceeds a first threshold, such that only the first buffer data is multiplexed; and
- measuring a transmission channel rate when the amount of the first buffer has exceeded the first threshold and when the amount of the first buffer is less than or equal to a second threshold for a predetermined time; and
- instructing said second buffer to stop discarding the second media data when the transmission rate reaches a value higher than or equal to a predetermined transmission rate, such that data from the first and second buffer is multiplexed.

14. A method for causing a computer to function as a transmitting device, said method comprising the steps of:
- temporarily storing a first media data to be transmitted in a first buffer;
- multiplexing a first buffer data from said first buffer and a second media data onto a single signal channel so as to output;
- temporarily storing multiplexed frames in a second buffer;
- transmitting frames from said second buffer to a network;
- estimating a transmission channel rate;
- determining a maximum transmittable size of a next transmission on the basis of transmission channel parameters;
- monitoring an amount of a second buffer data stored in said first buffer; and
- controlling said first buffer to transfer an amount of the first buffer data that is equivalent to the difference between the second buffer data and a maximum transmittable size when the second buffer data is less than the maximum transmittable size,
- wherein the transmission channel parameters include an immediately preceding transmission size, a network congestion flag, and a maximum size limiting value.

15. A method for causing a computer to perform as a transmitting device, said method comprising the steps of:
- temporarily storing a first media data to be transmitted in a first buffer;
- temporarily storing a second media data to be transmitted in a second buffer;
- generating a packet-multiplexed frame of different types of media data, said frame including a data structure including a UDP header followed by a serial number portion, a first media data size portion, first media data with a length equal to a size contained in said first media data size portion, and the second media data;

temporarily storing said frame generated in a third buffer;

demultiplexing the frame stored in said third buffer into a demultiplexed serial number portion, the first media data size portion, the first media data with the length equal to the size contained in said first media data size portion, and a demultiplexed second media data;

discarding the demultiplexed second media data;

regenerating a remultiplexed frame including a data structure including the demultiplexed serial number portion, the first media data size portion, and the first media data with the length equal to the size contained in the first media data size portion;

inputting the remultiplexed frame into said third buffer;

monitoring a number of frames stored in said third buffer; and instructing said second buffer to stop transferring the second media data and said third buffer to output frames stored in said third buffer when the number of frames exceeds a first threshold.

* * * * *